United States Patent [19]

Cragon

[11] 3,812,476

[45] May 21, 1974

[54] MEMORY DEVICE

[75] Inventor: Harvey G. Cragon, Austin, Tex.

[73] Assignee: Texas Instruments Incorporated, Dallas, Tex.

[22] Filed: Sept. 13, 1973

[21] Appl. No.: 397,055

Related U.S. Application Data

[63] Continuation of Ser. No. 199,179, Nov. 16, 1971.

[52] U.S. Cl. ....... 340/173 RC, 340/173 R, 307/224

[51] Int. Cl. ........................ G11c 11/40, G11c 21/00

[58] Field of Search .................. 340/173 R, 173 RC; 307/224; 333/29, 30

[56] References Cited

UNITED STATES PATENTS

| | | | |
|---|---|---|---|
| 3,548,203 | 12/1970 | Basse | 307/224 |
| 3,363,115 | 1/1968 | Stephenson | 340/173 R |
| 3,387,286 | 6/1968 | Dennard | 340/173 R |
| 3,549,911 | 12/1970 | Scott | 340/173 R |
| 3,593,037 | 7/1971 | Hoff | 340/173 R |
| 3,460,094 | 8/1969 | Pryor | 340/173 R |

FOREIGN PATENTS OR APPLICATIONS

| | | | |
|---|---|---|---|
| 1,146,921 | 11/1963 | Germany | 307/223 |

OTHER PUBLICATIONS

IEEE Transactions on Electronic Computers, October, 1965, pp. 711–713.
"Estimates for Placement of Voters in Triplicated Logic Network" K. J. Gurzi.

*Primary Examiner*—Terrell W. Fears
*Attorney, Agent, or Firm*—Harold Levine; Rene E. Gossman; Stephen S. Sadacca

[57] ABSTRACT

A memory device is disclosed. The memory device is comprised of a plurality of shift registers and a plurality of majority voters. The outputs of each of said shift registers are connected to the inputs of each of said majority voters.

2 Claims, 1 Drawing Figure

MEMORY DEVICE

Figure 1:
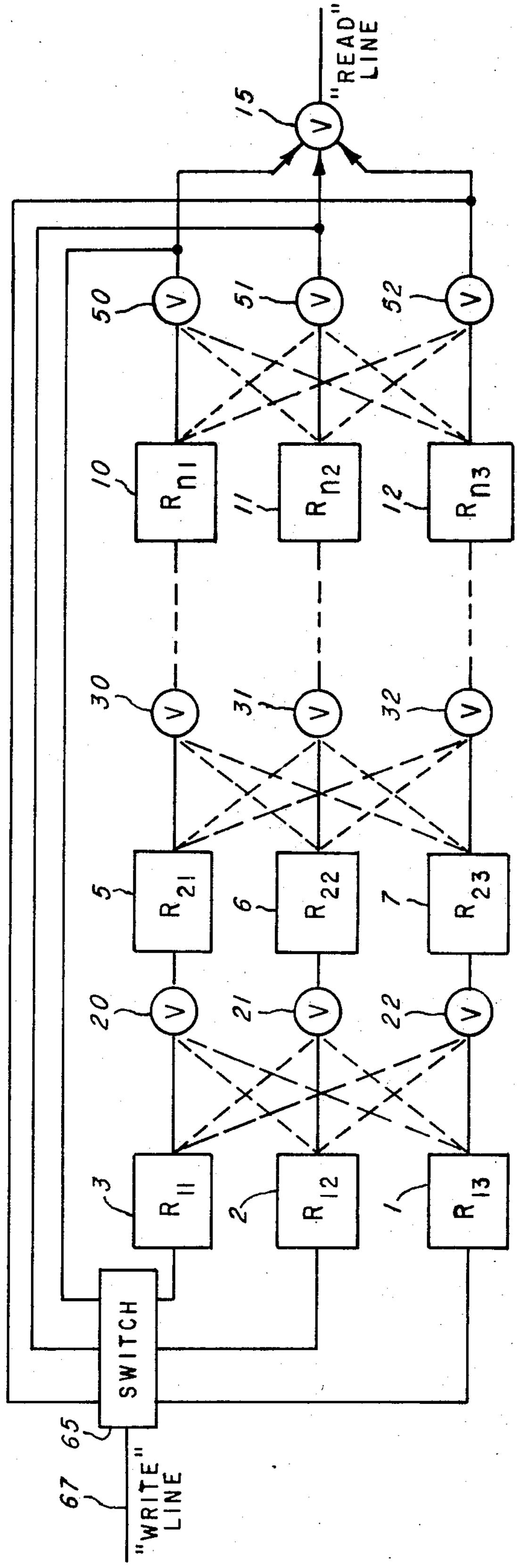

This is a continuation of application Ser. No. 199,179, filed Nov. 16, 1971.

This invention relates to electronic digital computers, and more specifically, to a memory device for said computers which contains a configuration of redundant components which insures both high reliability of error free operation and high yield of said memories from the manufacturing process. Said memory is conceived to contain the entire network of components fabricated on a single slice of semiconductor or other technology material.

Until recently, memory devices containing irremedial defective bits manufactured for use in high speed digital computers were considered unusable for high speed memory application. However, recent technological advancements have resulted in memory components with improved bandwidth characteristics which makes possible the cost effective design of memories with redundant components which operate at suitable speeds while detecting and, if properly designed, correcting the incorrect states of one or more binary digits in a computer word. The memory described herein is one such error-correcting device which uses redundancy to improve reliability of operation and produce high yield from the fabrication process if the probability of constructing error-free components is sufficiently high.

The memory described herein is constructed from a series of shift registers and majority voters. If the memory is chosen to have a redundancy factor of N, then the memory is configured with N parallel shift registers followed by N parallel majority voters operating at each stage of said memory. On each clock pulse of the memory, each shift register shifts all binary digits, said digits commonly known as bits to those skilled in the art, one digit to the right; thus, the right-most digit of a given shift register becomes the output of that register on each clock. The output of each of the N registers becomes one input to each of the N majority voters located at that memory stage. Thus, each voter has N inputs, one from each of the end shift registers. A majority voter is a component which has several binary inputs and one binary output. If the majority of the input states are 1's, then the output is a 1. If the majority of the inputs to the majority voter are 0's, then the output of the majority voter is a 0. Each majority voter has one output; that is, the majority state of all its N inputs which becomes the input to the corresponding shift register in the next memory stage in sequence. Therefore, if there is a redundancy factor of N

| OUTPUT COMPONENT (STAGE K) | INPUT COMPONENT (STAGE K+1) |
|---|---|
| $V_1$ | $R_1$ |
| $V_2$ | $R_2$ |
| . | . |
| . | . |
| $V_n$ | $R_n$ |

where $V_i$ is the ith parallel voter at any stage K and $R_i$ is the ith parallel shift register at stage K+1.

The memory is designed such that the last stage of the memory provides the input for the first stage creating a "circular" type memory. The three outputs of the last or any other memory stage may be input into a separate majority voter from which the status of any bit in the entire memory may be accessed, or "read," since the bits are continually clocked through the memory in circular fashion. Therefore, the memory may be designed with one or more "read" voters.

The memory set forth in completely fabricated on one slice of semiconductor, bi-polar or other technology material.

A memory designed with several "read" voters will have a faster access time than a memory with one "read" voter at the expense of the additional logic required and a smaller memory capacity for a given slice size.

The memory may also be designed with one or more "write" elements through which binary information may be input into the memory. This writing process may be accomplished by using a switch to disconnect the output from any memory stage K, which would normally be the input to the next stage K+1 in sequence, and inputting the desired information to stage K+1 directly.

It is therefore an object of this invention to provide a new and improved memory device made from parallel redundant shift registers and majority voters.

Another object of this invention is to provide a memory device which is insensitive to both irremedial defective sections caused by the manufacturing errors and also most transient errors that occur in shift-type memory systems.

It is also an object of this invention to provide a memory device which can be inspected after the manufacturing process by one simple test; that is, the necessity for inspecting each section of the memory for circuit completeness or defects from the manufacturing process is avoided. The memory may be checked for completeness by merely inputting a known bit pattern and comparing this with the output bit pattern to insure that the data within the memory is not destroyed, modified, or changed during the shifting process.

Having described the invention generally, other objects, features and advantages of the invention will be apparent from the following more particular description of the specific and preferred embodiment of the invention as illustrated in the accompanying drawing in which:

FIG. 1 is a specific embodiment of the memory device which may contain irremedial defective components therein.

The memory in FIG. 1 is designed with redundant shift registers. The first stage of the memory consists of shift registers 1–3 and majority voters 20–22. All shift registers in this specific embodiment of the memory herein are charged coupled devices and all majority voters are metal-oxide semiconductor transistors, the design and manufacturing processes of these two components being known and understood by those skilled in the art. A new fabrication technique for the design of charge coupled device shift registers may be found in a reference by W. S. Boyle and G. E. Smith in the *I.E.E.E. Spectrum*, July, 1971, page 18, entitled "Charge Coupled Devices: A New Approach to MIS Device Structures"; however, the concepts involved in the invention described herein apply equally well to all metal-oxide semiconductor, all bi-polar, and other technologies known in the art.

On each clock pulse, all digits of each register shift one digit to the right with the right-most digit being the output of each register. In FIG. 1, the output from registers 1–3 becomes one of the three inputs to each majority voter 20–22. The binary digit output from each majority voter 20–22 is the state of the majority of its input binary digits from registers 1–3. The output of majority voter 20 becomes the input to shift register 5, the output of voter 21 becomes the input to register 6 and the output to voter 22 is the input to register 7. This configuration of one stage of the memory provides for the correction of incorrect data caused by defective shift register sections providing there is no more than one bad bit output from any stage of the three registers on any one clock.

Thus, the output of the first stage of the memory composed of shift registers 1–3 and majority voters 20–22 provides the input to the second memory stage consisting of shift registers 5–7 and majority voters 30–32. This configuration continues for a series of N stages.

The output of the Nth stage of the memory consisting of shift registers 10–12 and majority voters 50–52 provides the input to the first stage consisting of shift registers 1–3 and majority voters 20–22 through switch 65 when no information is being input into the memory. The three outputs from the majority voters 50–52 of the last stage also provide the input to the read majority voter 15. Since the shift register memory is shifting on each clock, the status of any bit in said memory is available as the output of majority voter 15 once during each cycle of the memory, with the cycle time defined as the time required to shift one bit of information through all bit positions in all shift registers in said memory.

In FIG. 1, information may be written into the memory on "write" line 67. At the appropriate time during the shift cycle, switch 65, an element whose design is known to those skilled in the art, is activated which substitutes the input binary state on line 67 to shift registers 1–3 in place of the binary states from majority voters 50–52.

The number of stages N to be chosen and the bit length of each shift register depends on the type of materials used and the size of the semiconductor slice. For example, if 90 percent of a slice which has a diameter of 2 inches is used and the shift registers are chosen to be of length 1,024 bits, then, assuming one stage occupies 1 mil of surface area, 2,544 stages may be fabricated on this slice to yield a memory of approximately 848,000 bits of effective memory with a redundancy factor of 3. Methods for estimating the optimum distribution of redundant logic networks and majority voters are known to those skilled in the art and a reference describing such methods by Karyl J. Gurzi may be found in *I.E.E.E. Transactions on Electronic Computers*, October, 1965, pages 7–11, entitled "Estimates for Best Placement of Voters in a Triplicated Logic Network."

Having described the invention in connection with a certain specific embodiment thereof, it is to be understood that certain modifications may now suggest themselves to those skilled in the art, and is intended to cover such modifications as fall within the scope of the appended claims.

What is claimed is:

1. A memory device wholly contained on a single semiconductor slice comprising:

means for writing data into said memory device;

a plurality of register stages, each of said register stages having a plurality of redundant shift registers, said shift registers fabricated from charge coupled devices;

means for connecting said register stages into a circular memory;

a plurality of majority voting means;

means connecting the outputs of each of said redundant shift registers to the inputs of each of said majority voting means;

means connecting the output of each of said majority voting means in one stage to the input of one of said redundant shift registers in the succeeding stage; and means for reading information from said memory device.

2. The memory device claimed in claim 1 wherein said majority voting means are metal-oxide semiconductor transistors.

* * * * *